United States Patent
Baydoun

(10) Patent No.: US 8,530,761 B2
(45) Date of Patent: Sep. 10, 2013

(54) GROMMET WITH SERVICE PORT HAVING TWO CLOSED ENDS

(75) Inventor: Mohammed M. Baydoun, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/311,946

(22) Filed: Dec. 6, 2011

(65) Prior Publication Data
US 2013/0140060 A1 Jun. 6, 2013

(51) Int. Cl.
*H02G 3/18* (2006.01)
*H02G 3/22* (2006.01)

(52) U.S. Cl.
USPC .............. 174/650; 174/153 G; 174/152 G; 248/56; 16/2.1; 16/2.2

(58) Field of Classification Search
USPC .............. 174/650, 152 G, 153 G, 152 R, 135, 174/137 R, 142; 248/56; 16/2.1, 2.2
See application file for complete search history.

(56) References Cited

U.S. PATENT DOCUMENTS

| | | | |
|---|---|---|---|
| 5,856,635 A * | 1/1999 | Fujisawa et al. | 174/153 G |
| 6,495,767 B2 * | 12/2002 | Okuhara et al. | 174/152 G |
| 6,525,269 B2 * | 2/2003 | Sato | 174/153 G |
| 6,603,078 B2 * | 8/2003 | Okuhara et al. | 174/153 G |
| 6,897,380 B2 * | 5/2005 | Sakata et al. | 174/650 |
| 7,026,549 B1 * | 4/2006 | Smutny et al. | 248/56 |
| 7,788,766 B2 | 9/2010 | Mockett | |
| 8,022,304 B2 * | 9/2011 | Baydoun et al. | 174/152 G |

* cited by examiner

*Primary Examiner* — Angel R Estrada
(74) *Attorney, Agent, or Firm* — Frank MacKenzie

(57) ABSTRACT

A grommet includes a body having a first wall and a second wall. A passageway extends from the first wall to the second wall, and a service port extends from a first end adjacent to the first wall to a second end adjacent to the second wall. A first cap is integral with the first wall and covers the first end of the service port. Similarly, a second cap is integral with the second wall and covers the second end of the service port.

8 Claims, 2 Drawing Sheets

GROMMET WITH SERVICE PORT HAVING TWO CLOSED ENDS

BACKGROUND OF THE INVENTION

This invention relates in general to grommets that are used in holes formed through panels in vehicles to facilitate the passages of wires or other articles therethrough. In particular, this invention relates to an improved structure for a grommet that is more effective and less expensive than known grommets.

Most vehicles are provided with one or more panels or similar barriers that separate one portion of the vehicle from another. For example, a firewall is commonly provided in a vehicle to separate an engine compartment thereof from a passenger cabin. In many instances (both when the vehicle is manufactured and when installing an aftermarket device), it may be necessary or desirable for one or more wires or other articles to pass through these panels. To accommodate this, it is known to provide one or more holes through the panel to allow the wire or other article to pass therethrough.

However, the existence of such a hole can at least partially defeat the main purpose of the panel, which is to separate one portion of the vehicle from another. For example, a hole formed through a firewall can undesirably provide a pathway for water and other contaminants to pass from the engine compartment of the vehicle into the passenger cabin. Also, the presence of such a hole can undesirably provide a conduit through which noise can pass from the engine compartment of the vehicle into the passenger cabin. Lastly, the formation of such a hole can create a relatively sharp edge, which could cause damage to the wire or other article extending therethrough.

To address these problems, it is known to provide a grommet in the hole formed through the panel. Typically, the grommet includes a hollow cylindrical body that is formed from a plastic or elastomeric material. One or more flanges may be provided on the hollow cylindrical body to engage opposed sides of the panel to retain the grommet within the hole. The wire or other article extends through the hollow cylindrical body of the grommet The grommet minimizes the amount of open space extending through the panel, thereby minimizing the size of the pathways for contaminants and noise to pass from the engine compartment of the vehicle into the passenger cabin. Also, the grommet protectively covers any relatively sharp edges that might be present on one or both of the opposed sides of the panel, thereby protecting the wire or other article extending therethrough.

As mentioned above, the need for a hole through a firewall of a vehicle may arise not only when the vehicle is manufactured, but also later when installing an aftermarket device on the vehicle. To facilitate the installation of an aftermarket device on the vehicle, it is known to provide a grommet with two or more passageways, a first passageway that is used when the vehicle is initially manufactured and a second passageway that may be used when an aftermarket device is subsequently installed on the vehicle. The provision of these two or more hollow passageways eliminates the need to form a second, separate hole through the panel.

Although known grommets having multiple passageways have functioned satisfactorily, it would be desirable to provide an improved structure for a grommet that is more effective and less expensive than known grommets.

SUMMARY OF THE INVENTION

This invention relates to an improved structure for a grommet that is more effective and less expensive than known grommets. The grommet includes a body having a first wall and a second wall. A passageway extends from the first wall to the second wall, and a service port extends from a first end adjacent to the first wall to a second end adjacent to the second wall. A first cap is integral with the first wall and covers the first end of the service port. Similarly, a second cap is integral with the second wall and covers the second end of the service port.

Various aspects of this invention will become apparent to those skilled in the art from the following detailed description of the preferred embodiments, when read in light of the accompanying drawings.

DETAILED DESCRIPTION OF THE PREFERRED EMBODIMENTS

Figure 1:
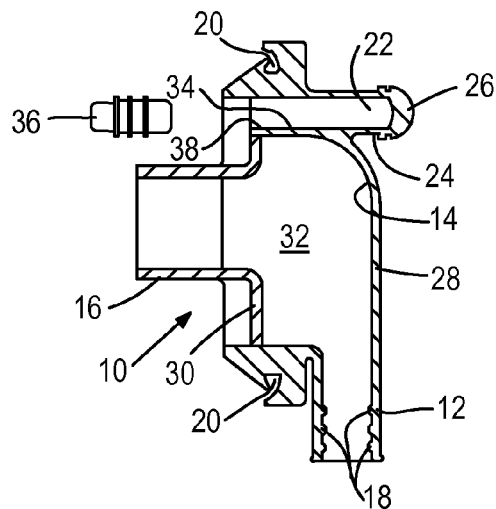
FIG. 1 is a sectional elevational view of a prior art grommet

Referring now to the drawings, there is illustrated in FIG. 1 a grommet, indicated generally at 10, that is conventional in the art. The prior art grommet 10 includes a first tubular port 12 that extends from a body portion 14. The prior art grommet 10 also has a second tubular port 16 that extends from the body portion 14. The first tubular port 12 and the second tubular port 16 are arranged generally orthogonally, although it is known to orient them otherwise. The first tubular port 12 and the second tubular port 16 are adapted to accommodate a wiring harness (not shown) that extends therethrough. The second tubular port 16 has one or more annular ridges 18 provided on an inside surface thereof to restrain movement of the wire harness relative to the prior art grommet 10 and to better accommodate wiring harnesses of differing diameters than would a smooth inside surface. An annular groove 20 is provided in the periphery of the prior art grommet 10 to engage opposed sides of a panel (not shown) to retain the prior art grommet 10 within a hole extending through the panel.

The prior art grommet 10 has a service port 22 provided therein that facilitates the passages of additional wires (not shown) through the prior art grommet 10, such as when adding a new wire to replace an existing broken wire in the wire harness or a service fix requires running an additional wire. The service port 22 has a first end 24 that is closed with a first cap 26. The first cap 26 is formed integrally with the remainder of the prior art grommet 10. When the need for the service port 22 arises, the first cap 26 is removed from the prior art grommet 10 (such as by cutting) in order to provide access to the service port 22.

The prior art grommet 10 is a double-walled grommet that includes a first wall 28 and a second wall 30. The double-walled configuration serves to reduce the amount of noise that can pass through the grommet more than a single-walled grommet would. The first and second walls 28 and 30 of the prior art grommet 10 define an internal port space 32. The first tubular port 12 and the second tubular port 16 both communicate with the internal port space 32 and together define a passageway that extends from the first wall 28 to the second wall 30, through which the wiring harness (not shown) can pass when it is installed. The service port 22 also extends from the first wall 28 to the second wall 30 of the prior art grommet 10. The service port 22 is separated from the internal port space 32 by a service port wall 34. The service port wall 34 extends from the first wall 28 to the second wall 30 and serves to isolate the service port 22 from the internal port space 32.

Because the service port 22 is only blocked at the first end 24, it provides a relatively small amount of insulation against the passage of noise through the prior art grommet 10. This can result in undesirable amounts of noise passing through the grommet To address this, the prior art grommet 10 also includes a service port plug 36 that is inserted in a second end 38 of the service port 22. The service port plug 36 can be inserted into the service port 22 of the prior art grommet 10 during the initial installation of the prior art grommet 10 on the panel. If the need subsequently arises, the service port plug 36 can be removed to provide completely through access to the service port 22.

Figure 2:
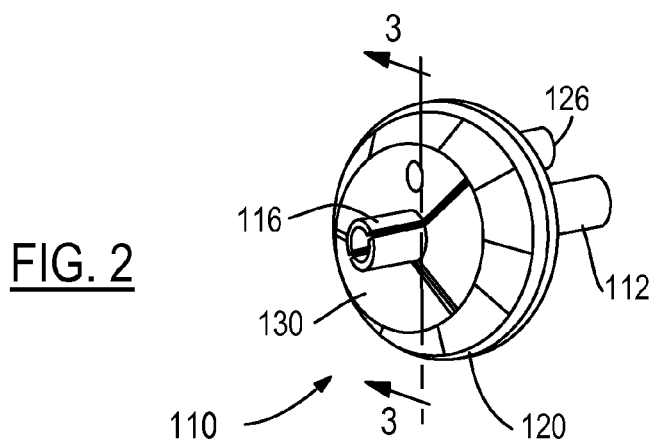
FIG. 2 is a perspective view of a first embodiment of a grommet in accordance with this invention.
Figure 3:
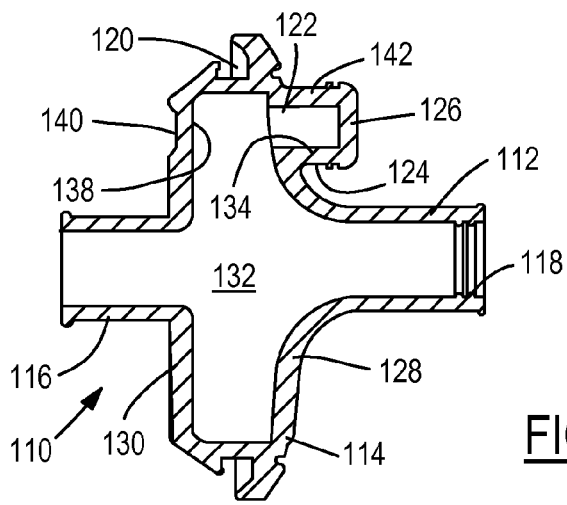
FIG. 3 is a sectional elevational view taken of the first embodiment of the grommet along the line 3-3 of FIG. 2.
Figure 4:
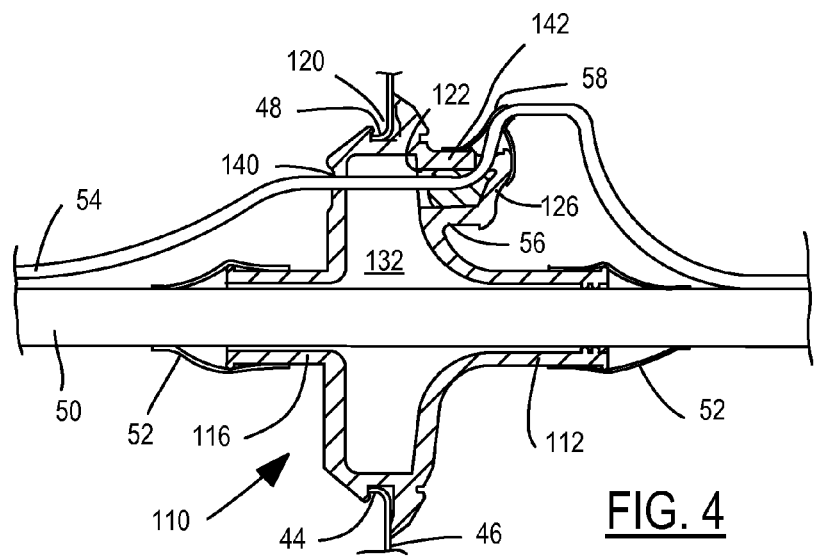
FIG. 4 is a sectional elevational view similar to FIG. 3 showing the first embodiment of the grommet installed in a hole formed through a panel and having first and second wires extending therethrough.

FIGS. 2, 3, and 4 illustrate a first embodiment of a grommet, indicated generally at 110, in accordance with this invention. The grommet 110 includes a first tubular port 112 and a second tubular port 116 that are generally coaxial, although such is not required. The grommet 110 includes a body portion 114 from which the first tubular port 112 and the second tubular port 116 extend. The first tubular port 112 and the second tubular port 116 can accommodate a wiring harness (not shown) extending therethrough in a known manner. The second tubular port 116 has one or more annular ridges 118 formed on an inside surface thereof to restrain movement of the wire harness relative to the grommet 110 and to better accommodate wiring harnesses of differing diameters than would a smooth inside surface. A groove 120 is provided in the periphery of the grommet 110 to engage opposed sides of a panel 46 (see FIG. 4) to retain the grommet 110 within a hole 44 extending through the panel 46.

The grommet 110 has a service port 122 that functions as a passageway through the grommet 110 for wires and other articles that need to be added after the assembly of the vehicle. The service port 122 includes a first end 124 that is closed with a first cap 126. The first cap 126 is formed integrally with a first wall 128 of the grommet 110. In other words, the first cap 126 is formed from a single piece of material with the first wall 128. However, it should be appreciated that the first cap 126 may, if desired, be made of other materials than the first wall 128, may be created at a different time than the first wall 128, and may be created by a process other than the process used to form the first wall 128. When the need for the service port 122 arises, the first cap 126 is removed from the grommet 110 (such as by cutting) in order to provide access to the service port 122.

The grommet 110 is illustrated as being a double-walled grommet that includes the first wall 128 and a second wall 130. The double-walled configuration serves to reduce the amount of noise that can pass through the grommet 110 more than a single-walled grommet would. The first and second walls 128 and 130 of the grommet 10 define an internal port space 132. The first tubular port 112 and the second tubular port 116 both communicate with the internal port space 132 and together define a passageway that extends from the first wall 128 to the second wall 130, through which the wiring harness (not shown) can pass when it is installed. The service port 122 also extends from the first wall 128 to the second wall 130 of the grommet 110.

The service port 122 also includes a second end 138 that is closed with a second cap 140. The second cap 140 is formed integrally with the second wall 130 of the grommet 110. In other words, the second cap 140 is formed from a single piece of material with the second wall 130. However, it should be appreciated that the second cap 140 may, if desired, be made of other materials than the second wall 130, may be created at a different time than the second wall 130, and may be created by a process other than the process used to form the second wall 130. When the need for the service port 122 arises, the second cap 140 is also removed from the grommet 110 (such as by cutting) in order to provide access to the service port 122. Prior to that, however, the service port 122 is closed at both the first end 124 and the second end 1238, as shown in FIG. 3.

The second cap 140 may be embodied as a locally-thin portion of the second wall 130. Such a structure can serve to help an installer of an aftermarket accessory precisely identify the location of the second cap 140 so that the installer may cut the proper portion of the second wall 130. This structure also serves to reduce the amount of material that is cut in order to use the service port 122. It should be appreciated that the second cap 140 may be embodied as other than the locally-thin portion of the second wall 130 if so desired. For example, the second cap 140 may be embodied as a locally-thick area or may be identified by texture, text, or other visual indicator. Also, the second end 138 of the service port 122 may include an extended tube structure (not shown) that is similar to an extended tube structure 142 provided on the first end 124 of the service port 122.

The grommet 110 includes a service port wall 134 that defines a portion of the service port 122. The illustrated service port wall 134 does not extend from the first wall 128 to the second wall 130, although such is contemplated by this invention. As a result, the illustrated service port 122 is not completely isolated from the internal port space 132. Consequently, the internal port space 132 includes a portion of the service port 122. This design aides in the manufacture of the grommet 110 because an internal tool or die may be used to define both the internal port space 132 and the service port 122, thereby allowing the grommet 110 to be molded as one piece in a single-shot process, unlike the prior art grommet 10. It should be appreciated, however, that the grommet 110 may be manufactured by processes other than single-shot molding if desired, and that the grommet 110 may be manufactured with the service port wall 134 extending completely from the first wall 128 to the second wall 130.

FIG. 4 shows the grommet 110 in an installed position within the hole 44 that extends through the panel 46. The grommet 110 is inserted so that an edge 48 of the hole 44 engages the groove 120. A wiring harness 50 is inserted through the first tubular port 112, the internal port space 132, and the second tubular port 116. If desired, the wiring harness 50 may have one or more layers of conventional tape 52 wound thereabout. The tape 52 assist in providing a seal between the wiring harness 50 and each of the first tubular port 112 and the second tubular port 116. The tape 52 also serves to restrict movement of the wiring harness 50 relative to the grommet 110.

When it is desired to pass an additional wire 54 or other article through the hole 44 formed through panel 46, the service port 122 of the grommet 110 can be employed. To accomplish this, the first cap 126 and the second cap 140 are cut or otherwise removed from the grommet 110 to provide access through the hole 44. If desired, the first cap 126 may be removed in its entirety from the grommet 110. Alternatively, as shown in FIG. 4, a portion of the first cap 126 may be slit and deflected to open the first end 124 of the service port 122. In either event, the second wire 54 can then be passed through the service port 122, as also shown in FIG. 4. A sealant, such as room temperature vulcanization silicone 56, may be used to completely re-seal the service port 122. Additional tape 58 may be also used to attach the second wire 54 to the extended tube structure 142 at the first end 124 of the service port 122. The second wire 54 may also be attached to the wiring harness 50 using one or more conventional zip-ties (not shown) in order to further restrict movement of the second wire 54 relative to the grommet 110.

Figure 5:
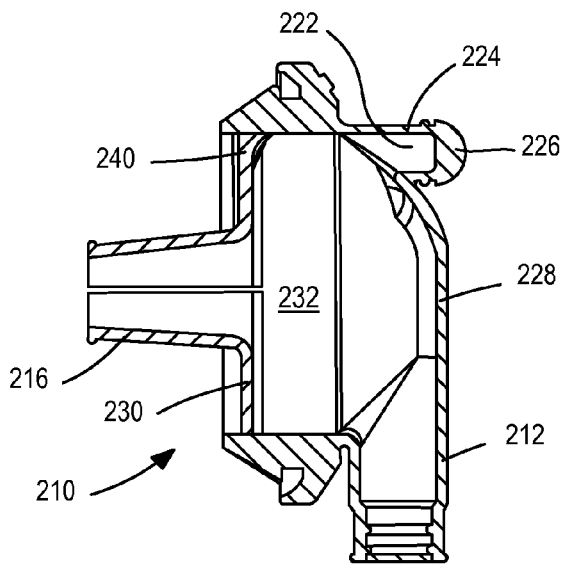
FIG. 5 is a sectional elevational view of a second embodiment of a grommet in accordance with this invention.
Figure 6:
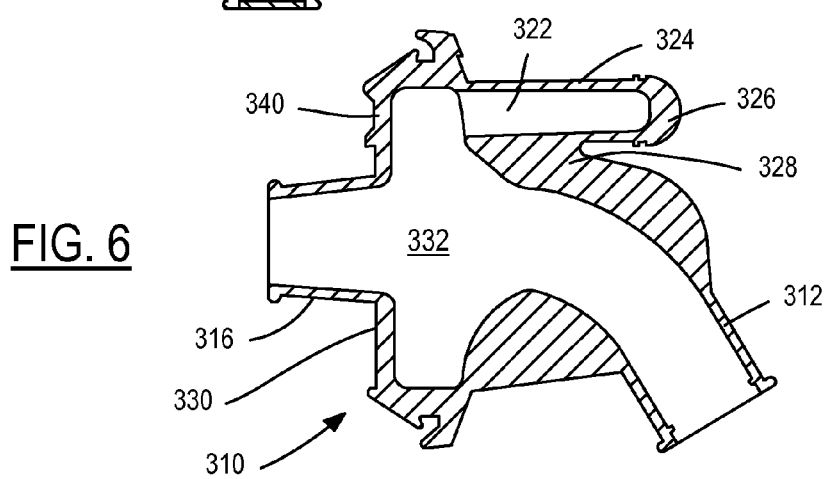
FIG. 6 is a sectional elevational view of a third embodiment of a grommet in accordance with this invention.

FIGS. 5 and 6 respectively illustrate second and third embodiments of the grommet 210 and 310, respectively, of this invention. The second and third embodiments of the grommets 210 and 310 are similar to the grommet 110 in structure and operation, and like reference numbers are used to indicate similar structures. The second and third embodiments of the grommets 210 and 310 differ from the first embodiment of the grommet 110 in the relative orientation of their respective first tubular ports 212 and 312 and second tubular ports 216 and 316.

The principle and mode of operation of this invention have been explained and illustrated in its preferred embodiments. However, it must be understood that this invention may be practiced otherwise than as specifically explained and illustrated without departing from its spirit or scope.

What is claimed is:

1. A grommet for mounting in a hole, the grommet comprising:
    a body having a first wall and a second wall;
    a wire passage extending through the first wall and the second wall;
    a service port extending through the first wall and the second wall
    a first cap integral with the first wall and covering a first end of the service port; and
    a second cap integral with the second wall covering a second end of the service port.

2. The grommet of claim 1 wherein a portion of the service port is defined by a service port wall, and the service port wall does not extend from the first wall to the second wall.

3. The grommet of claim 1 wherein a port space is defined between the first wall and the second wall, and the port space includes a portion of the wire passage and a portion of the service port.

4. The grommet of claim 3 wherein the grommet is one piece.

5. The grommet of claim 1 wherein the grommet is one piece.

6. The grommet of claim 5 wherein the grommet is molded.

7. The grommet of claim 1 wherein the first cap comprises a locally-thin portion of the first wall.

8. A grommet comprising:
    a body portion including a first wall, a second wall, and a periphery that define an internal space;
    a first passageway extending through the internal space of the body portion from the first wall to the second wall; and
    a second passageway extending through the internal space of the body portion from the first wall to the second wall, wherein a first cap is formed integrally with the first wall and covers a first end of the second passageway, and wherein a second cap is formed integrally with the second wall and covers a second end of the second passageway.

* * * * *